J. W. JEPSON.
REGULATING APPARATUS FOR GENERATORS.
APPLICATION FILED JAN. 9, 1911.
1,236,179.
Patented Aug. 7, 1917.
2 SHEETS—SHEET 2.
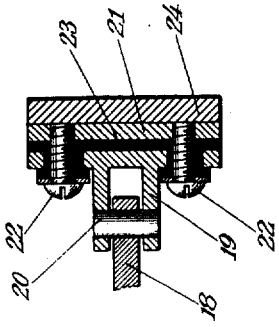
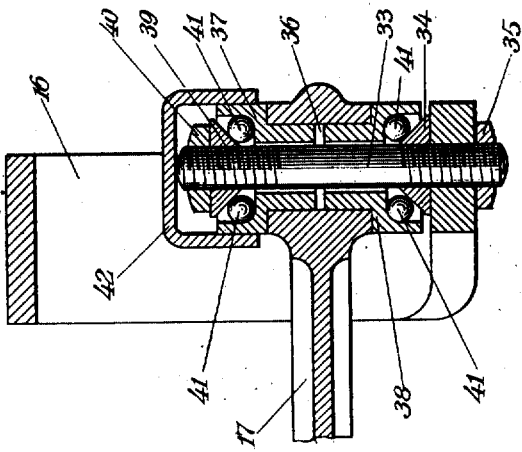
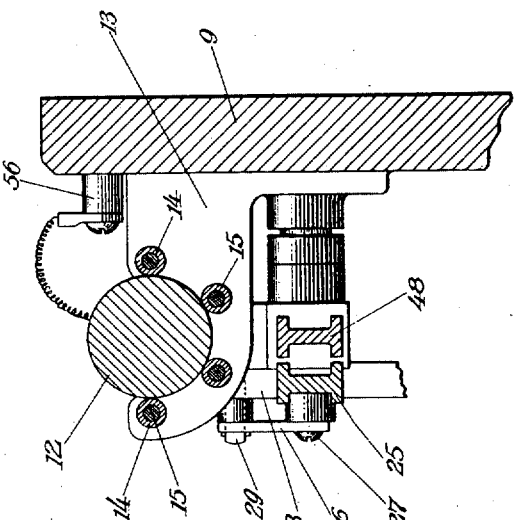
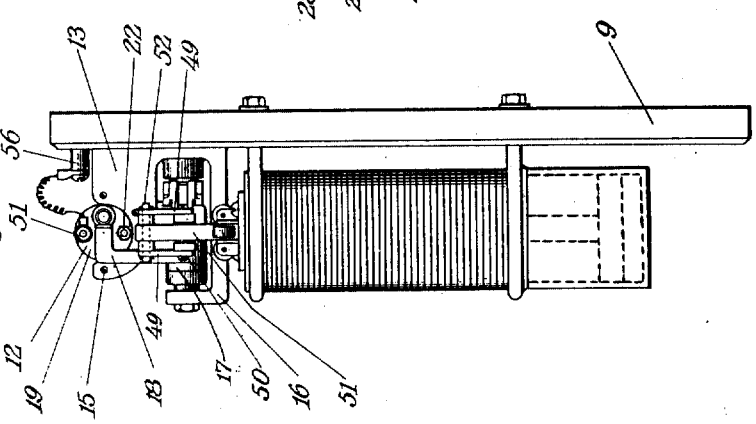
Witnesses
Inventor
John W. Jepson
By Attorneys
Kenyon & Kenyon

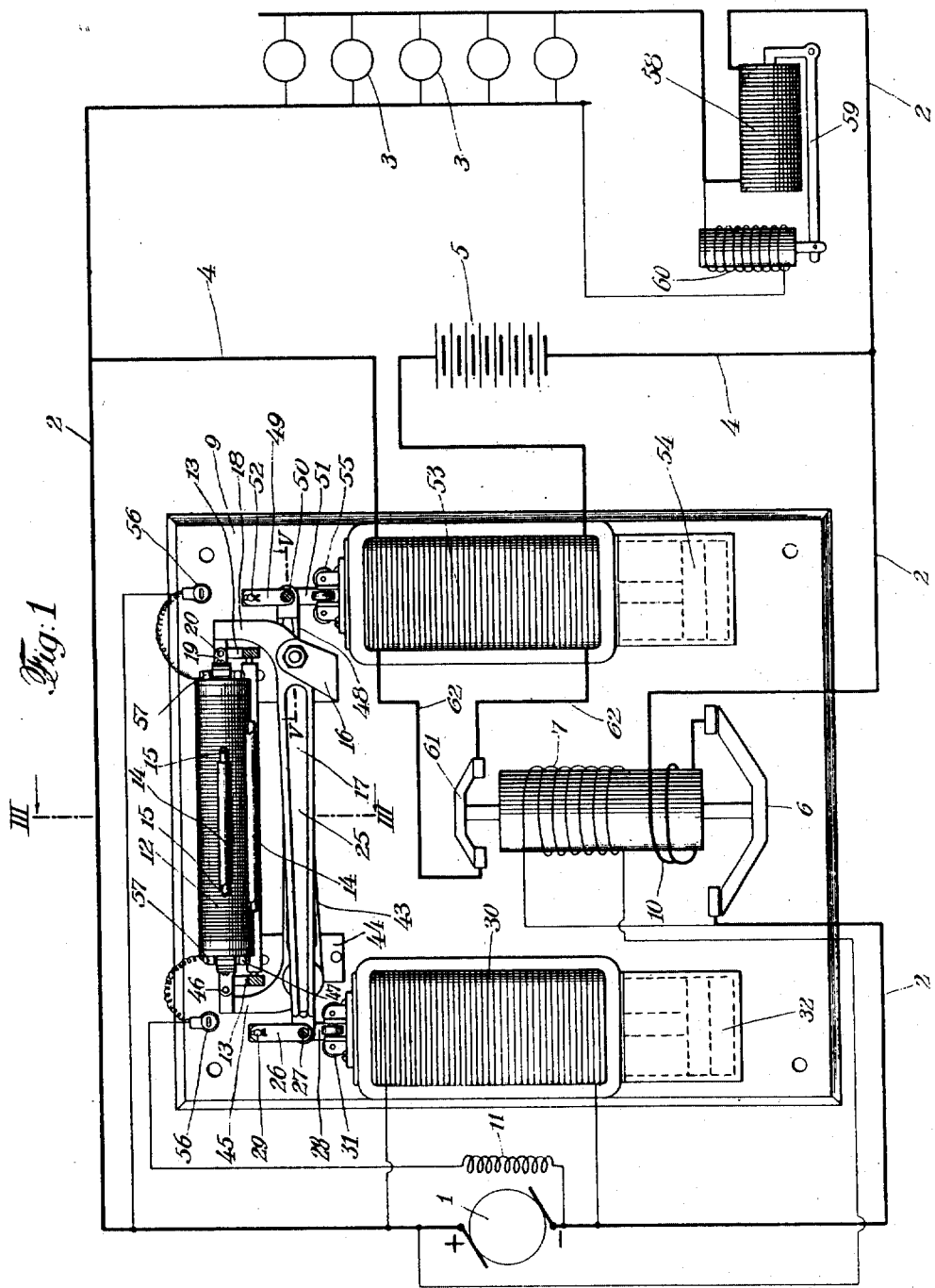

UNITED STATES PATENT OFFICE.

JOHN W. JEPSON, OF DEPEW, NEW YORK, ASSIGNOR TO GOULD COUPLER COMPANY, A CORPORATION OF NEW YORK.

REGULATING APPARATUS FOR GENERATORS.

1,236,179. Specification of Letters Patent. Patented Aug. 7, 1917.

Original application filed October 14, 1910, Serial No. 587,003. Divided and this application filed January 9, 1911. Serial No. 601,589.

*To all whom it may concern:*

Be it known that I, JOHN W. JEPSON, a citizen of the United States, and a resident of Depew, county of Erie, and State of New York, have invented certain new and useful Improvements in Regulating Apparatus for Generators, of which the following is a specification.

My invention relates to improvements in electrical regulating apparatus but in the form illustrated is especially designed for electrical systems of distribution, for the electric lighting of railway cars, in which a storage battery and work circuit are supplied by a main generator driven at a variable speed and in which automatic means are provided for regulating the action of the generator in accordance with the needs of the system.

One object of my invention is to provide an improved form of apparatus whereby the generator may be regulated in accordance with the needs of the battery so that a substantial charging current may be maintained therefor and yet when the battery becomes sufficiently charged the charging current may be cut down as desired. It is one purpose of my invention to carry out these features with a minimum amount of apparatus which is extremely simple and efficient in its operation and construction, and which takes up a minimum amount of space. In a preferred embodiment of my invention I provide a system having two regulating coils, one to maintain a substantial charging current and the other to limit the rise in voltage of the generator, said coils operating mechanically independently of one another and so arranged that one coil becomes substantially inoperative while the other is operating, and while the first is operating, the second has substantially no effect on the regulation.

Further objects, features and advantages will more clearly appear from the detailed description given below, taken in connection with the accompanying drawings which form a part of this specification.

This application is a division of my application Serial No. 587,003, filed October 14, 1910, for electrical systems of distribution.

In the drawings,

Figure 1 is a view, partly diagrammatical, showing a system embodying one form of my invention, as applied to a car lighting system, in which the main generator is driven at a variable speed by the movement of the car;

Fig. 2 is an end view of parts of the generator regulating apparatus shown in Fig. 1;

Fig. 3 is a section taken on the line III—III of Fig. 1;

Fig. 4 is a detail section taken at one end of the generator regulating rheostat, and Fig. 5 is a section taken on the line V—V of Fig. 1.

Referring to Fig. 1, 1 represents a main generator supplying the mains 2—2 to supply the work circuit or lamps 3. Connected across the mains 2—2 in a circuit 4 is a storage battery 5. In the negative main 2 is a switch 6 arranged to close the main circuit when the voltage of the generator has reached its proper value. For this purpose the switch 6 is arranged to be raised by the electro-magnetic coil 7 connected across the terminals of the generator 1. When the generator reaches this predetermined voltage, the switch 6 closes the circuit through the negative main 2. A coil 10 in the negative main 2 is also arranged to act to increase the effect of coil 7 when the generator is furnishing current but acts to open the switch 6 upon the voltage of the generator decreasing below that of the battery in a well known manner.

The generator 1 is provided with a shunt field 11, connected across its terminals. In series with the field 11 is a carbon pile 12 forming a suitable rheostat for the regulation of the main generator. The carbon pile 12 is supported upon a base 9 by means of brackets 13 carrying supporting porcelain rods 14 held by metallic rods 15 secured in the brackets 13, so that the pile 12 is movable as a whole relative to the framework.

Secured to the base 9 at the right-hand end of the carbon pile 12 is a bracket 16 having a lever 17 pivotally mounted thereon. The lever 17 is provided with a short arm 18 extending upwardly and pivotally connected to a member 19 by a pin 20. (See also Fig. 4.) The member 19 is secured to a flat circular member 21 by means of screws 22, but the member 19 is insulated from the member 21 by means of insulating material 23. On the inside of the member 21 is a plate 24 which is designed to abut against the right-hand end of the pile of carbon blocks 12. The long arm 25 of the lever 17 extends below the pile 12 and substantially parallel therewith and beyond the other end of the carbon pile 12 where it is forked and pivoted to the links 26 at 27. The links 26 are pivoted to an upright member 28 at 29, as clearly shown in Fig. 1. The member 28 is rigidly connected to a suitable core of the solenoid 30 and to keep the core and member 28 in proper alinement suitable guide rollers 31 are provided. Below the solenoid 30 is a suitable dash pot 32 of any well known construction. The solenoid 30 has its windings connected directly across the generator 1 to be responsive to voltage variations thereof and to voltage variations of the battery, as clearly shown in Fig. 1.

The pivotal arrangement of the lever 17 in the bracket 16 is clearly shown in detail in Fig. 5. Secured to the bracket 16 is a bolt 33 forming a pivot pin for the lever 17. The bolt 33 is secured to the bracket 16 by means of nuts 34 and 35. The lever 17 is provided with a suitable aperture 36 through which the bolt 33 passes and between the bolt 33 and the lever 17 there are provided bearing members 37 and 38. On the other end of the bolt 33 there is a nut or bearing member 39 secured by means of a nut 40. The nuts 34 and 39 are beveled on the inside, as is clearly shown, and there are placed between the beveled faces of these nuts and the bearing members 37 and 38, balls 41 so as to provide suitable ball bearings for the lever 17. A cap 42 is placed over the inside end of the pivotal arrangement and bolt 33 to prevent dust from entering the device.

In a similar manner I provide a lever 43 pivoted in a bracket 44 secured to the plate 9 adjacent the left-hand end of the carbon pile 12. The short arm 45 of the lever 43 extends upwardly and is pivotally connected at 46 to a member similar to the member 19, which member has secured to it a member similar to the member 21 by means of screws. These parts operate on the left-hand end of the pile in substantially the same manner as the parts 19, 21, 22, 23 and 24 operate on the right-hand end of the pile. The long arm 48 of the lever 43 extends below the carbon pile 12 and substantially parallel thereto as well as to the long arm 25 of lever 17. The long arm 48 extends beyond the right-hand end of the carbon pile 12 within the bracket 16, and is pivotally connected to links 49 at 50. The links 49 are pivotally connected to an upright member 51 at 52. (See Figs. 1 and 2.) The upright member 51 has secured to it a suitable core operating within a solenoid 53. Below the solenoid 53 is a suitable dash pot 54, of any well known construction.

In order to keep the core and member 52 in proper alinement suitable rollers 55 are provided on top of the solenoid 53. The windings of the solenoid 53 are connected in series with the battery, as clearly shown in Fig. 1.

The conductors leading from the carbon pile 12 to the field 11 and positive main 2 are connected to the binding posts 56 and to the carbon pile 12 by means of binding posts 57.

The pivotal arrangement of the lever 43 in the bracket 44 is substantially the same as the pivotal arrangement of the lever 17 in the bracket 16, which is clearly shown in Fig. 5.

Between the battery 5 and the work circuit 3 I provide a second carbon pile 58 in series in the main 2 which acts as a regulator for the lamps or translating devices 3. The carbon pile 58 is controlled by a lever 59 of any well known form, which lever is operated by means of a solenoid 60 having its windings connected directly across the work circuit, as clearly shown in Fig. 1. The solenoid 60 controls the carbon pile 58 so as to keep the voltage at the translating devices substantially constant irrespective of voltage variations across the battery and generator.

Connected to the top of the core operating the switch 6 is a second switch 61 arranged to close a shunt circuit 62 around the windings 53. That is, when the switch 61 is closed the windings 53 are short-circuited and thus rendered ineffective when the battery is discharging.

In operation the battery is arranged to feed the work circuit 3 when the generator is not running or when its voltage is too low for practical operation thereunder. Under these conditions the switch 61 closes the circuit 62, thereby more directly connecting the battery to the work circuit or lamps 3, although the carbon pile resistance 58 is included in circuit in order that the voltage at the lamps may be maintained substantially constant irrespective of changes of the battery voltage.

If, now, the speed of the generator be increased so that it will produce a voltage sufficient to feed the lamps, the coil 7 closes the switch 6 and opens the switch 61. This connects the generator with the battery and work circuit and also throws the windings of coil 53 in series with the battery. When the voltage of the generator rises sufficient to produce a proper charging current for the battery 5 the charging current is maintained substantially constant by means of the coil 53. That is, when such a charging current is produced the strength of the coil 53 is such that it exerts a pull upon the lever 43 and supports the lever and core. However, if the voltage of the generator tends to increase, thereby tending to increase the charging current, the coil 53 would raise the long arm 48, thereby relieving the pressure on the left-hand end of the pile 12 and increasing the resistance in series with the field 11, so that the voltage of the generator will be accordingly decreased sufficient to maintain the charging current substantially constant. If a decrease in generator voltage occurs a reverse action takes place to increase the pressure upon the carbon blocks 12, thus increasing the voltage of the dynamo 1 so that the charging current may be brought back substantially to the same value.

The operation thus described continues until the battery becomes properly charged. When it has become sufficiently charged, as indicated by its rise in voltage to a predetermined point and the corresponding rise of the generator voltage, the electro-magnet or solenoid 30 becomes sufficiently energized to support its core. If the battery voltage rises any higher, the core of the solenoid 30 is raised, thereby increasing the resistance of the carbon pile 12 and decreasing the generator voltage. This cuts down the charging current, as will be clearly understood, and prevents any further rise in the generator voltage. Thus the coil or solenoid 30 is not brought into action until the battery has become properly charged and it then acts to prevent any further increase in generator voltage and to drop off the battery current. It therefore usurps the functions of the coil 53 and the long arm 48 of lever 43 readily drops back to its initial position, due to the cutting down of the charging current.

That is, when the battery is receiving its substantially constant charging current, the voltage coil 30 and its core remain substantially inoperative or do not affect the regulation, and when the voltage coil 30 becomes active upon the rheostat the current coil 53 and its core become substantially inoperative or ineffective upon the regulation. It is also noted that the electro-magnets or solenoids 30 and 53, operating upon the carbon pile 12, operate mechanically independently of one another. This is because while either coil is regulating by varying the position of its core, the other core is inactive because its coil has not sufficient power to lift it. In the position shown in the drawings the main switch is open so that there is not sufficient voltage or current to lift either core. The pile is therefore under compression and may thereby hold both cores floating, as shown. When, however, the generator is connected and sufficient power is developed in either coil to lift its core and relieve the compression, the other core can not float but falls back until it is mechanically supported, which, in the specific embodiment shown, is effected by engagement of the lever 17 or 43 with one of the guide rollers 31 or 55. If while current coil 53 is regulating and, therefore, its core is floating and lever 17 of the voltage core is resting on the guide roller, the voltage finally rises to a point that will lift the voltage core, then the current will begin to decrease and the current lever 43 will gradually fall back against a guide roller, leaving the voltage core to float and control the regulation. During the brief transition while both cores are floating, the carbon pile as a whole will shift its position.

It will be clear from the above that the main generator is operated upon, or controlled separately by two independently working solenoids or electro-magnets. This is important since it provides means whereby the generator may be regulated for a constant charging current or constant current output irrespective of voltage changes of the battery. And yet when the battery has become properly charged the voltage coil 30 is brought into operation to decrease or eliminate the battery charging current. If both the voltage and current coils were operating upon the same core or armature or mechanically connected this advantage could not be had, since the variations in the voltage coil due to increases in the voltage of the battery all the time the same is being charged, would be affected by the battery charging current. This would produce a charging current which tapered from the beginning, while in my system the charging current is maintained substantially constant until the battery has become fully charged when the charging current is rapidly dropped off as desired.

Although preferable, it is not necessary to the broadest aspects of my improvements, that the coils 30 and 53 act directly upon the rheostat, since their functions may be accomplished indirectly to a certain extent by other means.

From the above it will be clear that I have provided an exceptionally simple and efficient arrangement for bringing about the desirable ends above mentioned. By using a single carbon pile for the solenoids 30 and 53, the amount of resistance in series with the field 11 is very materially decreased, thus cutting down the loss of energy in the regulating apparatus, and making the same generally more effective. Moreover, the cost of construction is materially reduced, as is also the space occupied by the apparatus. By providing a lever operating upon one end of the pile and a lever operating upon the other end of the pile, these advantages are obtained. For these reasons, not only is the device extremely simple, but in view of these facts and by having the long arms 25 and 48 extend below the carbon pile 12 and substantially parallel thereto and substantially parallel to one another and extending slightly beyond the ends of the carbon pile 12, great economy in space is obtained as well as simplicity of operation. Furthermore, the arrangement is attractive as well as convenient, and by the features specified suitable space is provided between the solenoils 30 and 53 for the automatic switches 6 and 61.

Although I have described my improvements in great detail, nevertheless I do not desire to be limited thereto except as clearly specified in the appended claims, since many changes and modifications may well be made without departing from the spirit and scope of my invention.

Having thus fully and clearly described my improvements, what I claim as new and desire to secure by Letters Patent, is:

1. In an arrangement of the class described, a resistance comprising a number of contacting units, a lever operating upon one end of said resistance to move said units toward and permit them to move away from each other and a lever independently operating similarly upon the other end of said resistance.

2. In an arrangement of the class described, a resistance adapted to be varied in length and whose resistance value varies with its length, a lever operating upon said resistance from one end and a lever independently operating upon said resistance from the other end.

3. In an arrangement of the class described, a resistance comprising a number of contacting units, a lever operating upon one end of said resistance to move said units toward and permit them to move away from each other, a lever independently operating similarly upon the other end of said resistance and an electromagnet for controlling the operation of each lever.

4. In an arrangement of the class described, a resistance adapted to be varied in length and whose resistance value varies with its length, a lever operating upon said resistance from one end, a lever independently operating upon said resistance from the other end and an electro-magnet for controlling the operation of each lever.

5. In an arrangement of the class described, a suitable support, a carbon pile movable as a whole relatively to the support, a lever for operating upon one end of said pile and a lever independently operating upon the other end of said pile to vary the resistance of the pile.

6. In an arrangement of the class described, a carbon pile, a lever operating upon one end of said pile and extending toward the other end of the pile, and a second lever operating on the second mentioned end of said pile and extending toward the first mentioned end of said pile.

7. In an arrangement of the class described, a suitable support, a carbon pile movable as a whole relatively to the support, a lever operating upon one end of said pile and extending toward the other end of the pile, and a second lever operating on the second mentioned end of said pile and extending toward the first mentioned end of said pile.

8. In an arrangement of the class described, a suitable support, a carbon pile movable as a whole relatively to the support, a lever operating upon one end of said pile and extending toward the other end of the pile and a second lever independently operating on the second mentioned end of said pile and extending toward the first mentioned end of said pile, and an electromagnet mechanically connected to each lever for controlling the operation thereof.

9. In an arrangement of the class described, a carbon pile, a lever operating upon one end of said pile and extending toward and beyond the other end of the pile, and a second lever operating on the second mentioned end of said pile and extending toward and beyond the first mentioned end of said pile.

10. In an arrangement of the class described, a carbon pile, two levers operating upon said pile mechanically independent of one another, and electro-magnets for controlling the operation of said levers.

11. In an arrangement of the class described, a carbon pile, two levers operating upon said pile mechanically independent of one another, each lever having a short arm mechanically connected to the pile and a long arm, said long arms extending substantially parallel to one another, and means for operating said levers.

12. In an arrangement of the class described, the combination of a resistance medium comprising a plurality of contacting units, means operating on each end of said resistance medium, and electro-responsive means controlling said operating means.

13. The combination of a carbon pile, two lever members adapted to vary the resistance of said pile, both of said lever members having long arms extending beneath said pile, two separate cores connected to said lever members respectively, two dash pots for said cores respectively, and two solenoids for operating said cores respectively.

14. In an arrangement of the class described, a resistance medium, two heads engaging the same and each movable toward the other to reduce the value of said resistance, and away from the other to increase said value, each head being stopped in its first mentioned movement while the other is within the range of its operating movement, and means for independently actuating said heads.

15. In an arrangement of the class described, a resistance medium, two heads engaging the same and each movable toward the other to reduce the value of said resistance, and away from the other to increase said value, each head being stopped in its first mentioned movement while the other is within the range of its operating movement and independent electro-magnetic means for actuating the respective heads.

16. In an arrangement of the class described, a suitable support, a resistance medium movable as a whole with respect to said support, two heads engaging the same and each movable toward the other to reduce the value of said resistance, and away from the other to increase said value, each head being stopped in its first mentioned movement while the other is within the range of its operating movement, and means for independently actuating said heads.

17. In an arrangement of the class described, a carbon pile, two independently movable levers engaging opposite ends thereof and each stopped in its forward movement while the other lever is within the range of its operating movement.

18. In an arrangement of the class described, a suitable support therefor, a carbon pile adapted to move as a whole relatively to said support, and two independently movable levers which tend to move said pile in opposite directions, each being stopped in its movement in one direction while the other lever is within its operating range of movement.

In testimony whereof, I have signed my name to this specification, in the presence of two subscribing witnesses.

JOHN W. JEPSON.

Witnesses:
J. L. WALKER,
W. H. PATTENDEN.

Copies of this patent may be obtained for five cents each, by addressing the "Commissioner of Patents, Washington, D. C."